(12) United States Patent
Day et al.

(10) Patent No.: US 8,140,517 B2
(45) Date of Patent: Mar. 20, 2012

(54) DATABASE QUERY OPTIMIZATION USING WEIGHT MAPPING TO QUALIFY AN INDEX

(75) Inventors: Paul R. Day, Rochester, MN (US);
Randy L. Egan, Rochester, MN (US);
Roger A. Mittelstadt, Byron, MN (US);
Dale M. Stahl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/419,039

(22) Filed: Apr. 6, 2009

(65) Prior Publication Data
US 2010/0257153 A1 Oct. 7, 2010

(51) Int. Cl.
*G06F 7/00* (2006.01)
*G06F 17/30* (2006.01)

(52) U.S. Cl. . 707/713; 707/715; 707/748; 707/E17.017; 707/E17.131

(58) Field of Classification Search ................. 707/713, 707/715, 748, E17.017, E17.131
See application file for complete search history.

(56) References Cited

U.S. PATENT DOCUMENTS

| | | | | |
|---|---|---|---|---|
| 6,151,604 | A * | 11/2000 | Wlaschin et al. | 707/741 |
| 6,618,719 | B1 * | 9/2003 | Andrei | 707/999.002 |
| 7,155,442 | B2 * | 12/2006 | Carlin et al. | 707/693 |
| 7,308,437 | B2 * | 12/2007 | Day et al. | 707/999.002 |
| 2002/0059224 | A1 * | 5/2002 | McConnell et al. | 707/5 |
| 2002/0184251 | A1 * | 12/2002 | Ho et al. | 707/205 |
| 2008/0162385 | A1 * | 7/2008 | Madani et al. | 706/12 |

OTHER PUBLICATIONS

Gloria Bordogna & Gabriella Pasi—"Flexible Querying of WEB Documents"—SAC'02 Proceedings of the 2002 ACM Symposium on Applied Computing—2002 ACM (pp. 675-680:1-6).*
Gloria Bordogna & Gabriella Pasi—"Personalized Indexing and Retrieval of Heterogeneous Structured Documents"—Information Retrieval, vol. 8, No. 2,—2005 StringerLink Science (pp. 301-318:1-18).*

* cited by examiner

*Primary Examiner* — Jean B Fleurantin
*Assistant Examiner* — Anh Ly
(74) *Attorney, Agent, or Firm* — Wood, Herron & Evans LLP

(57) ABSTRACT

A method, apparatus, and program product is provided to, in response to receiving a first database query for which usage of shared weight indices is prohibited, determine whether a shared weight index associated with a column of a database table referenced by the first database query can be utilized as a non-shared weight index to optimize the database query. The method, apparatus, and program product determine whether the column includes at least one changed weight value and determines whether the database query references at least one changed weight value in the column. The shared weight index is utilized to optimize the first database query in response to determining that the shared weight index can be utilized as a non-shared weight index to optimize the first database query.

23 Claims, 7 Drawing Sheets

DATABASE QUERY OPTIMIZATION USING WEIGHT MAPPING TO QUALIFY AN INDEX

FIELD OF THE INVENTION

The invention relates to computers and computer systems, and in particular, to databases and utilizing indexes to optimize database queries.

BACKGROUND OF THE INVENTION

Databases are used to store information for an innumerable number of applications, including various commercial, industrial, technical, scientific and educational applications. Many databases are relational databases, which organize information into formally-defined tables consisting of rows (i.e., records) and columns (i.e., fields), and which are typically accessed using a standardized language such as Structured Query Language (SQL). Database Management Systems (DBMS's) are the computer programs that are used to access the information stored in the databases and to process searches, or queries, against the databases.

In general, a database query references one or more database tables in a database and includes one or more predicates. Each predicate includes an expression that references a column of a database table and a key value within the column of the database table and an operator (e.g., EQUAL, etc.). Other operators (e.g., AND, etc.) may also be applied to multiple predicates. To execute the query, many DBMS's perform query optimization, in which multiple execution plans or access plans for satisfying the database query are examined to determine the most efficient way to execute the query.

One type of optimization that may be utilized in an access plan includes the use of a database index. Just as an index in a book facilitates locating information on a specific topic quickly and without blindly paging through the book, database indexes provide similar benefits by providing a method to quickly locate data of interest in a database. In particular, the shorter entries of an index may be quickly searched for data (e.g., a key value) that satisfies the database query, and then the corresponding locations in the database table may be searched to retrieve the results. Thus, only a subset of the database table is searched. Without an index, a DBMS performs a full table scan of the database table, blindly searching through every row in the database table until the target data is located. Depending upon where the data resides in the database table, such a table scan can be a lengthy and inefficient process.

A database index is usually built over one or more columns of the database table with specific key values selected for inclusion in the index. The DBMS will then create an index where each specified key value has an entry in the index with a pointer from each key value to its corresponding record in the database table. In many cases indexes include sufficient information about which particular records in a database table likely match a particular predicate without having to retrieve and scan all of the individual records of the database table, thus saving significant time.

One area in which the use of indexes can become complicated is in connection with textual data, and in particular textual data that is case sensitive. When textural information is stored as a key value in a column of a database table it is represented by a binary code that is recognizable and usable by a computing system. There are many different ways to represent information via a binary code otherwise known as character encoding. One of the earliest examples is the Extended Binary Coded Decimal Interchange Code (EBCDIC) based on an 8-bit binary code in which the lowercase English letter "f" is represented by the binary value 10000110 (hexadecimal 86) and the uppercase English letter "F" is represented by the binary value 11000110 (hexadecimal C6). Another early example is the American Standard Code for Information Interchange (ASCII) based on a 7-bit binary code in which the lowercase English letter "f" is represented by the binary value 1100110 (hexadecimal 66) and the uppercase English letter "F" is represented the binary value 1000110 (hexadecimal 46). Other character encoding methods include Unicode and its' variations. In the event a database query is executed and the information to be analyzed may be either a lowercase or an uppercase letter (e.g. denoting a female with either an "f" or an "F") a database query looking for records containing females may be more efficient if it can recognize either as satisfying the query. This creates a situation where both the lowercase "f" and the uppercase "F" are to be treated the same or given the same weight and are generally referred to as shared weight attributes. Where an index is built over one or more columns of a database table, and there is a desire for either or both of a lowercase and uppercase key value to answer a database query, the index is known as shared weight index. A corresponding sort sequence table is created from the shared weight index that effectively maps the lowercase values to the corresponding uppercase values, or vice versa, allowing both lowercase and uppercase information to have the same weight.

There are different ways a database query may sort through the information contained in the key values. One particular sorting method is based on the information's specific binary or hexadecimal value, referred to as a hexadecimal sort sequence. In the event a database query is executed requiring a hexadecimal sort sequence a shared weight index typically may not be used because an incorrect record could be returned. For example, in a system using EBCDIC where the hexadecimal value is C6 for an uppercase "F" and 86 for a lowercase "f" and a shared index sets them equal to each other ("f"=C6), a database query for records containing only an uppercase "F" utilizing a hexadecimal sort sequence would also return records containing a lowercase "f," which is an incorrect return. Therefore, an additional, non-shared weight index may be required to enable query optimization.

However, as the reliance on information increases, both the volume of information stored in most databases, as well as the number of users wishing to access that information, likewise increases. Moreover, as the volume of information in a database, and the number of users wishing to access the database increases, the amount of computing resources required to manage such a database increases as well. Thus, new ways to use database indexes are needed in order to continue to provide significant improvements in query performance, since database indexes often require many system resources to build. Otherwise, database users may be hampered in their ability to maximize intelligent information retrieval.

Consequently, there is a need in the art for reuse and alternative uses of existing database indexes.

SUMMARY OF THE INVENTION

Embodiments of the invention address these and other needs in the art by providing a method, apparatus, and program product to qualify indexes in order to enhance database query optimization, e.g. to enable shared weight indexes to be reused in appropriate circumstances with database queries that require non-shared weight sort sequences. In particular, embodiments of the invention may determine whether a shared weight index, built over a column of a database table and referenced by the database query, may be utilized as a non-shared weight index in order to optimize the database query. A determination is made as to whether the column includes any changed weight values and whether the database query references any changed weight values in the column. The shared weight index is utilized to optimize the database query in response to determining that the shared weight index can be utilized as a non-shared weight index to optimize the database query.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

Figure 1:
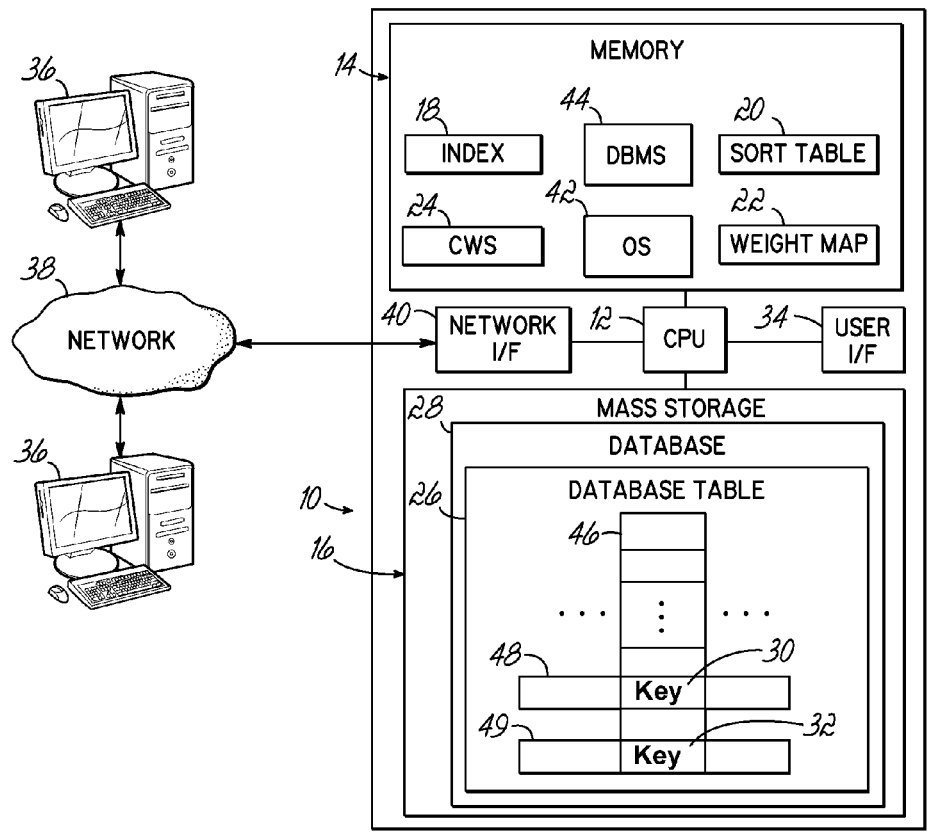
FIG. 1 is a diagrammatic illustration of a networked computing system capable of supporting one or more Database Management Systems (DBMS) accessing one or more databases, and suitable for implementing weight mapping index qualification consistent with embodiments of the invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Embodiments consistent with the principles of the present invention allow database query optimizers to include in optimization plans some indexes that may otherwise be unusable by ascertaining that indexes known as shared weight indexes contain usable information and may be utilized during a database query that normally requires a non-shared weight index, such as one utilizing a hexadecimal sorting, thereby decreasing the number of indexes, decreasing the amount of database maintenance, decreasing the database's overhead, and increasing the overall efficiency of the DBMS.

Embodiments of the invention in particular include a method, apparatus, and program product to determine whether a shared weight index associated with a column of a database table referenced by a database query can be utilized as a non-shared weight index to optimize the database query, including determining whether the column includes at least one changed weight value and determining whether the database query references at least one changed weight value in the column. This allows the use of the shared weight index to optimize the database query in response to the determination that the shared weight index can be utilized as a non-shared weight index to optimize the database query.

In some embodiments of the invention, a shared weight index is utilized to optimize a database query by utilizing the shared weight index as a non-shared weight index. In addition, in some embodiments, an index associated with the column from a database table is created, where the index is configured with a shared weight attribute. The shared weight index is created based upon the index. Some embodiments generate a sort sequence table associated with the shared weight index, where the shared weight index includes a plurality of entries, and where the sort sequence table includes a value correlation for each entry of the shared weight index. In these embodiments, the value correlation may be associated with a location offset of the shared weight index.

In some embodiments, a weight map associated with the sort sequence table is generated, wherein the sort sequence table may include a plurality of entries, and where the weight map may include a weight correlation for each entry in the sort sequence table. In these embodiments, the weight map may contain a binary 1 in the location corresponding to each value to location offset pair in the sort sequence table that does not match. A binary 1 in any location in the weight map will prohibit the utilization of the shared weight index in the database query optimization.

Turning to the drawings, wherein like numbers denote like parts throughout the several views, FIG. 1 illustrates an exemplary hardware and software environment for an apparatus 10 suitable for implementing a database management system incorporating query optimization with indexes consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

In the context of the invention, at least one index 18 may be resident in memory 14. Memory 14 may include a sort sequence table 20, a weight map table 22, and a changed weight summary table 24. Index 18 may be practically any shared weight index that contains information about key values identified in a database query and information about records in database table 26 located in database 28 that include instances of the key values 30, 33. In the context of the invention, "index" or "indexes" may be any shared weight index or structure.

Computer 10 also typically receives a number of inputs and outputs for communicating information externally. For interface with a user or operator, computer 10 typically includes a user interface 34 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 36 coupled to computer 10 over a network 38. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 40 with one or more networks 38 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 34, and 40, as is well known in the art.

Computer 10 operates under the control of an operating system 42, and executes or otherwise relies upon various computer software applications, components, programs, objects, modules, data structures, etc. For example, a database management system (DBMS) 44 may be resident in memory 14 to access a database 28 resident in mass storage 16. Database 28 may have at least one database table 26 and each database table may have at least one column containing key values 30, 32. Multiple key values may be present in a column, including multiple instances of a single key value. As illustrated, database table 26 has a column 46, which has at least one key value, such as key values 30 and 32, which are concurrently associated with records 48 and 49 respectively within the table 26. Key values 30 and 32 may contain the same or different information. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable media include but are not limited to recordable type media such as volatile and non-volatile memory devices, floppy and other removable disks, hard disk drives, magnetic tape, optical disks (e.g., CD-ROMs, DVDs, etc.), among others.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
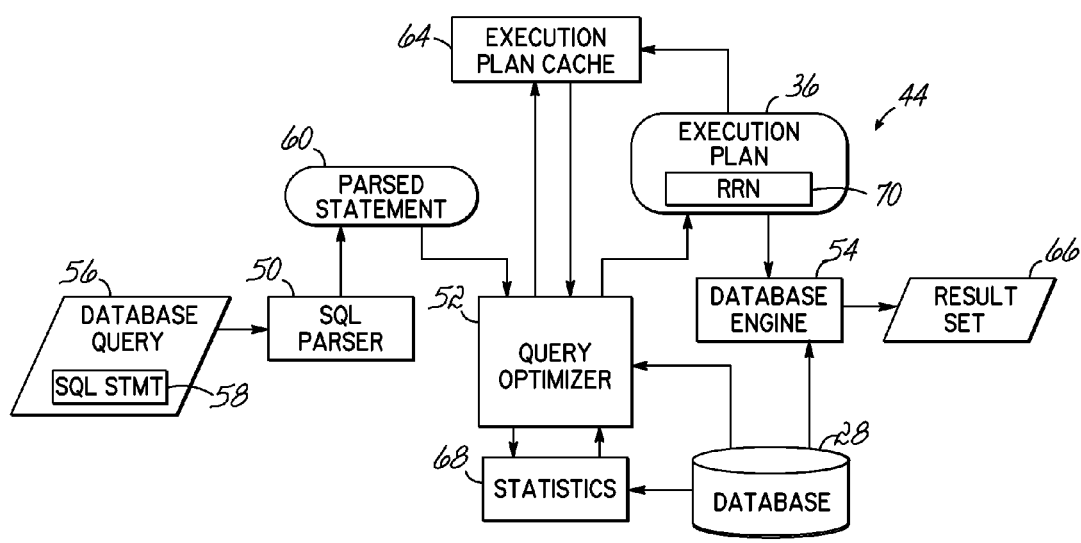
FIG. 2 is block diagram of the Database Management System (DBMS) referenced in FIG. 1.

FIG. 2 next illustrates in greater detail the principal components in one implementation of DBMS 44. The principal components of DBMS 44 that are generally relevant to query execution are a Structured Query Language (SQL) parser 50, query optimizer 52 and database engine 54. SQL parser 50 receives from a user (or more typically, an application executed by that user) a database query 56, which in the illustrated embodiment, is provided in the form of an SQL statement 58. Database query 56 may have a hexadecimal sort sequence requirement from the user. SQL parser 50 then generates a parsed statement 60 therefrom, which is passed to optimizer 52 for query optimization. As a result of query optimization, an execution plan or access plan 62 is generated. Execution plan 62 may have the hexadecimal sort sequence requirement from database query 56.

Once generated, execution plan 62 is forwarded to execution plan cache 64 to be stored for future use and to database engine 54 for execution of the database query on the information in database 28. The result of the execution of the database query is typically stored in a result set, as represented at block 66. To facilitate the optimization of queries, the DBMS 44 may also include statistics 68, which may be statistical information that is gathered, created, and/or analyzed using database 28 for query optimizer 52.

Despite the exemplary system illustrated in FIG. 1 and the exemplary implementation of DBMS 44 illustrated in FIG. 2, these are not intended to limit the present invention. Indeed, those skilled in the art will recognize that alternative hardware and/or software environments may be used without departing from the scope of the invention.

Figure 3:
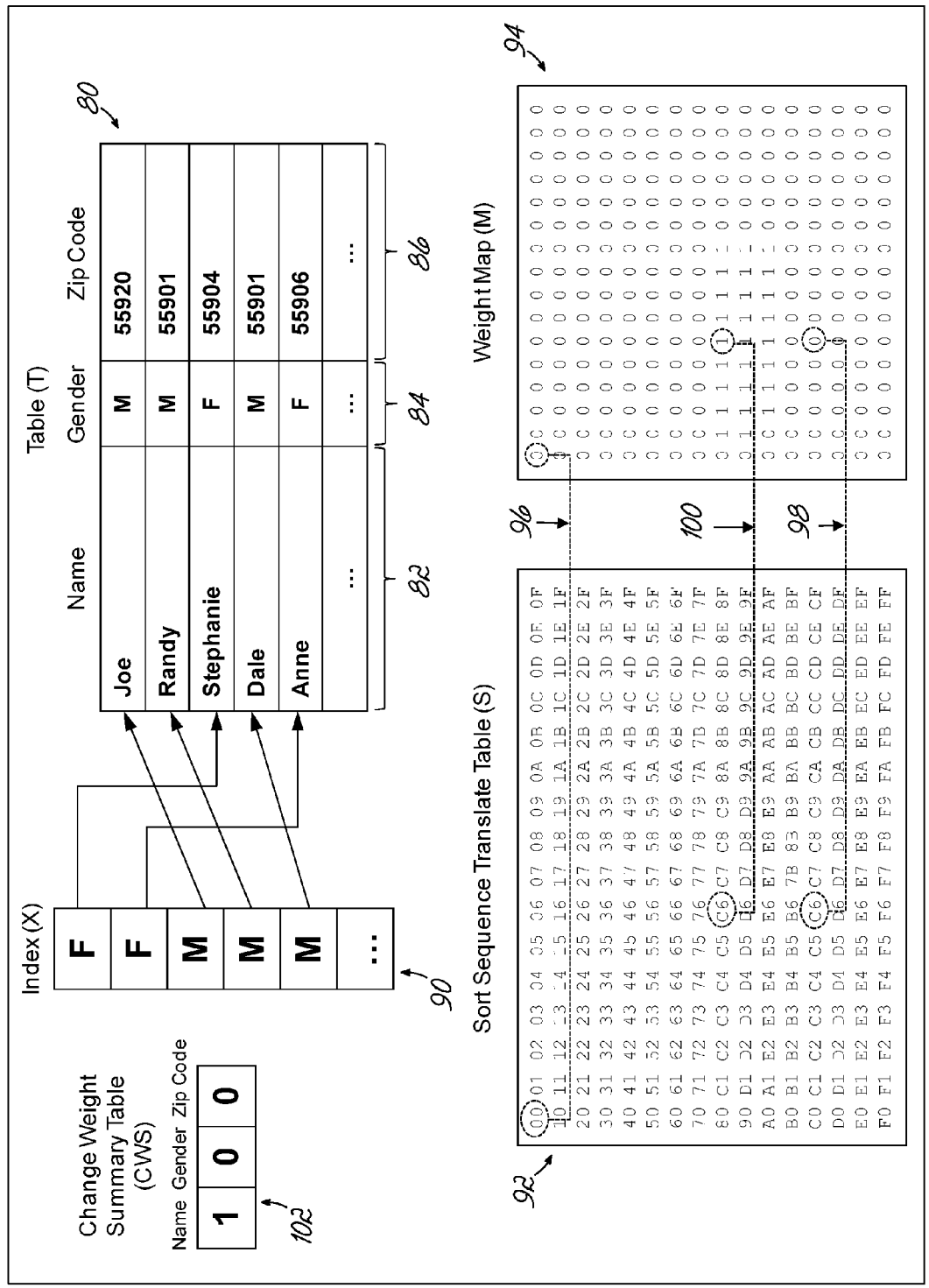
FIG. 3 is a diagram illustrating an exemplary table, index, sort sequence translation table, and a weight map capable of being used in the DBMS of FIG. 2.

As an example and to better illustrate weight mapping index qualification consistent with the invention, FIG. 3 illustrates and exemplary table (T) 80 with three columns: Name 82, Gender 84, and Zip code 86. A shared weight index (X) 90 is then created over the table 80 with the intent that queries that select on the Gender column 84 will retrieve both upper and lower case matches for the selection character. Keys for the index 90 for table T 80 may also be Zip code and Name. For simplicity, only the key for Gender in the index is shown. When the index 90 is created with a shared weight attribute, a sort sequence table (S) 92 is created. Each of the 256 characters in the English CCSID (coded character set ID) are defined in the table S 92, which the DBMS 44 retrieves when there is a need for upper and lower case to sort the same weight.

After creating table S 92, a weighted map M 94 is created. For each of the 256 entries in table S 92, which is known to be a monocase sort sequence table, if the value in the table 92 is the same as its location offset in the table 92, then no indicator is set in map M 94. For example, '00'x is located at offset '00'x, so this is not a "changed" weight, and the same relative position in map M is set to a 0 to indicate not changed (relationship shown as 96). Similarly, the EBCDIC value for an upper case "F" is 'C6'x, and at offset 'C6'x in the table, the value is 'C6'x, so this is not a changed weight, and the corresponding relative position in map M is set to 0 (relationship shown as 98). But the value for lower case "f" is EBCDIC '86'x and the value at the offset '86'x in the table is 'C6'x (for equal weight to upper case "F"), so because '86'x is not equal to 'C6'x, the weight for lower case "f" is a changed weight, and this is indicated by setting a 1 into the same relative position in map M (relationship shown as 100). Map M 94 may have single bit indicators for each of the 256 entries in the Sort Sequence Table S 92.

Additionally, a shown in FIG. 3, a Change Weight Summary table (CWS) may also be created to quickly identify any columns in Table T which may or may not contain change weight values. The CWS table is generally a one row table with a column for each of the columns in table (T). For each of the columns, if any rows contain changed weight data, an indicator of "1" is set in the corresponding column in the CWS table. If no rows contain changed weight data, an indicator of "0" is set in the corresponding column in the CWS table. For example, CWS table 102 in FIG. 3, indicates changed weight data somewhere in the Name column, but no changed weight data in the Gender or Zip Code columns.

Figure 4:
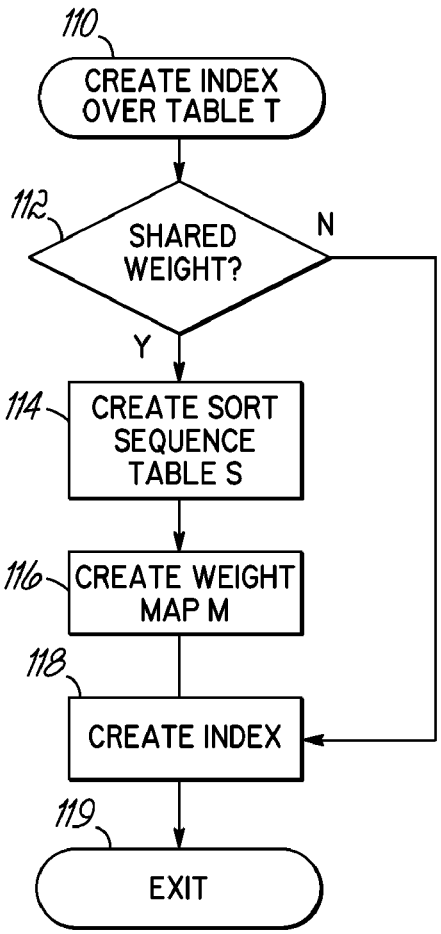
FIG. 4 is a flowchart illustrating the creation of a shared weight index with supporting files in the DBMS of FIG. 2.

The creation of the index and weighted map is summarized in flowchart 110 in FIG. 4. A check is made to determine if the index is a shared weight index (block 112). If the index is a shared weight index ("Yes" branch of decision block 112), then the sort sequence table S 92 is generated (block 114). After the creation of the sort sequence table S 92, a weight map M 94 is generated (block 116). A shared weight index is then generated (block 118). If the index is not a shared weight index ("No" branch of decision block 112), then the non-shared weight index is created (block 118) and a different algorithm appropriate for the index is executed. The process concludes at block 119.

Figure 5:
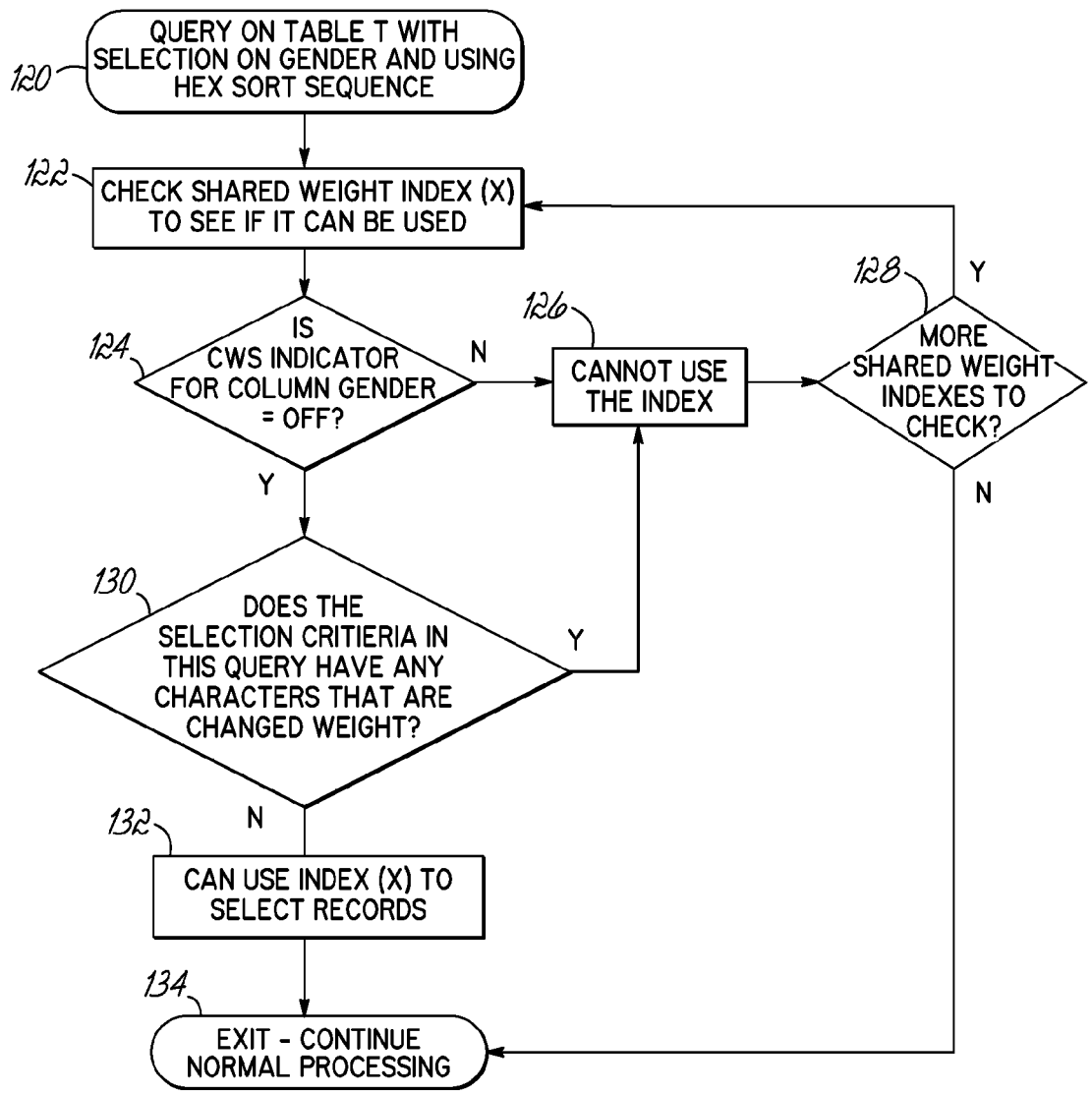
FIG. 5 is a flowchart illustrating a database query qualifying and using a shared weight index in the DBMS of FIG. 2.

Referring now to flowchart 120 in FIG. 5, when a query is run against table T 80 with selection on Gender, and specifies *HEX sort sequence (where values are sorted based on their EBCDIC values), index X 90 is analyzed by the query optimizer 52 as a possible index to use to execute the query (block 122). However, before the index can be used, in some embodiments, the query optimizer 52 tests two qualifications: (1) the column in the index does not contain changed weight characters, and (2) the query's selection does not reference any changed weight characters for the given column(s). For this index 90, a changed weight summary (CWS) 102 for the given column (e.g. Gender) is analyzed (block 124). If the analysis indicates that there are no changed weights (i.e., no lower case values) for Gender in the rows of table T 80 ("Yes" branch of decision block 124), then the query optimizer 52 may use this index 90 even though it is a shared weight index. If the CWS indicates there are changed weights ("No" branch of decision block 124), then the query optimizer 52 cannot use the index (block 126) and a check is made to determine if there are more shared weight indexes (block 128). If there are more shared weight indexes ("Yes" branch of decision block 128), then the process continues at block 122, otherwise the process exits at block 134. If the query optimizer 52 can use the index, a check is made to determine if the selection criteria in the query has characters that are changed weight (block 130). If there are changed weight characters ("Yes" branch of decision block 130), then the query optimizer 52 can exit early because there are no lower case letters in the column for the index 90, or the index will not be used (block 126) and a check is made to determine if there are more shared weight indexes (block 128). If there are no changed weight characters ("No" branch of decision block 130), then the index may be used by the database engine 54 to select and retrieve records (block 132). Normal processing continues at block 134.

For example, a query generated by the SQL statement SELECT*FROM T WHERE GENDER='F' may use index X 90 to select the records within table T 80, even though index X 90 is shared weight index and the query is not shared weight. Alternately, if the query is to find all men living in the Byron Zip code, a query may be generated by the SQL statement SELECT*FROM T WHERE GENDER='M' AND Zip code='55920'. If CWS 102 for the Gender column indicates no changed weights in that column, and CWS 120 for the Zip code indicates no changed weights, then index X 90 may be used to retrieve the records for this query, again even though index X is a shared weight index and the query is not shared weight.

Figure 6:
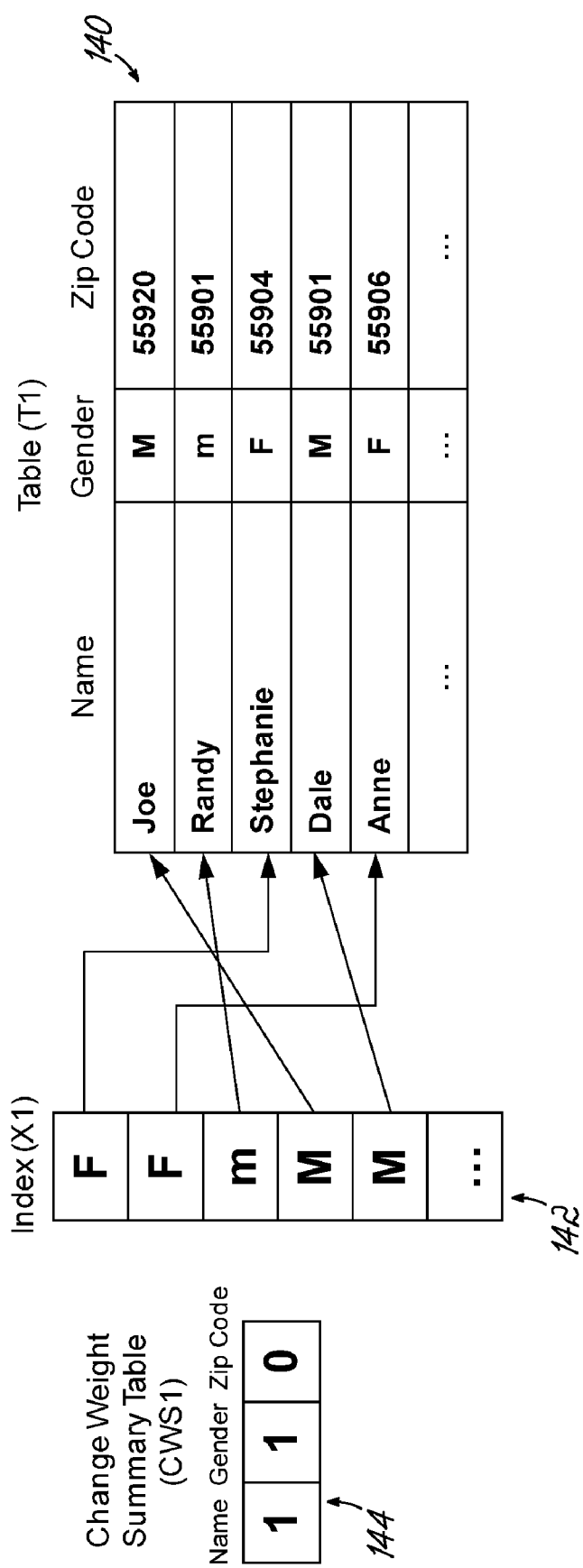
FIG. 6 is a diagram illustrating another exemplary table, index, changed weight summary table capable of being used in the DBMS of FIG. 2.

As another example and to better illustrate weight mapping index qualification consistent with the invention, FIG. 6 illustrates a table T1 140 and Index X1 142 similar to that of FIG. 3, but the index X1 now contains changed weight data. Referring now to the table (T1) 140, index (X1) 142 and CWS1 144 in FIG. 6, if the selection predicates reference character values that are changed weight characters, then this shared weight index X1 142 can be used for that query. But, as above, if all the character values referenced in the query, referencing the Gender column 84, are not changed weight, then shared weight index X1 142 cannot be used for that query because the CWS1 144 indicates that the Gender column 84 is shared weight. If the Gender column 84 contains no lower case characters, however, such as in FIG. 3, but the query tests for lower case "f", two possibilities arise. If the query is an "EQUAL" query then the optimizer 52 may use index 90 and may exit early because it knows there are no rows with lower cases. But if the query is a "GREATER" than or "LESS" than on the column, then the optimizer cannot us this shared weight index. The most common queries are for equals.

Data contained in database tables is rarely static. Data is often added, modified, or even in some cases deleted. As the data in the table changes, the Index may also change. One option is to regenerate the index and CWS each time the data changes. This option is time consuming, may be rather costly, and is not very efficient. Other options to update the index, consistent with embodiments of the invention, may be seen in FIGS. 7-9.

Figure 7:
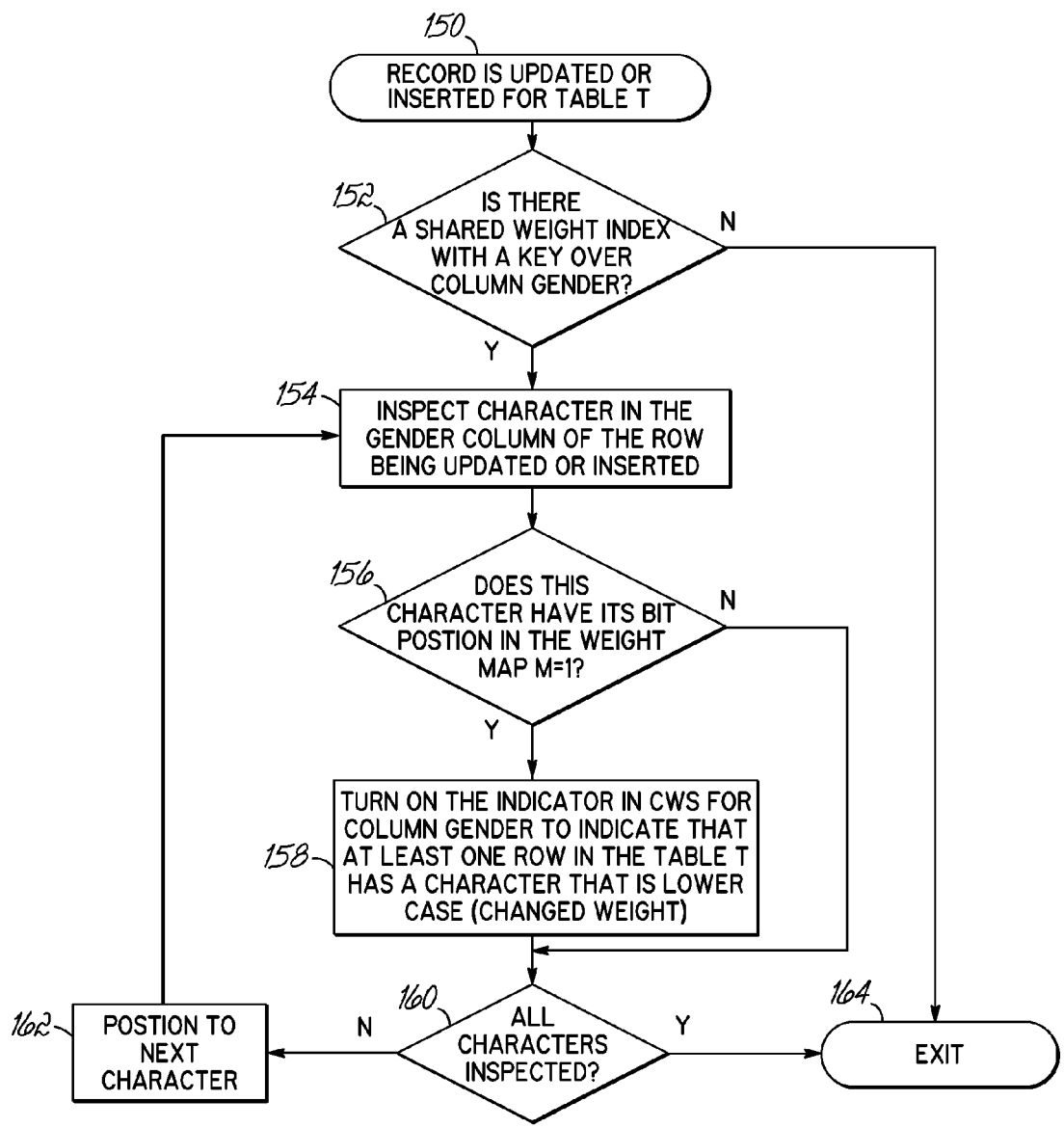
FIG. 7 is a flowchart illustrating the process of updating the files that support the shared weight index when records are updated or added to a database table in the DBMS of FIG. 2.

Turning first to flowchart 150 in FIG. 7, when data is inserted or updated, a check is made to determine if the index over the column is a shared weight index (block 152). If the index is shared weight ("Yes" branch of decision block 152), then a character in the column of the row being inserted or updated is inspected (block 154). If the character has a weight value of 1 in the weigh map ("Yes" branch of decision block 156), then the indicated in the CWS for that column is turned on to indicated that at least one row in the table has a character that is changed weight (lower case) (block 158). If the character does not have a weight value of 1 ("No" branch of decision block 156), then the process continues at block 160. If all of the characters have not been inspected ("No" branch of decision block 160), then focus is positioned to the next character (block 162) and the process continues at block 154. If all of the characters have been inspected ("Yes" branch of decision block 160), or if the index is not a shared weight index ("No" branch of decision block 152), the process ends at block 164.

For example, for an insert and/or update, the value of each of the characters in the Gender column 84 in the example in FIG. 3 (in this case one character for Gender) of the row to be inserted or updated may be subscripted with the actual character value to test the bit in map M. If the bit in that position in the changed weight map M is a 1, then that is indicated in the Change Weight Summary (CWS) table for column Gender, setting the indicator value to ON, indicating that there is at least one row in table T with a lower case (changed weight) character in the Gender column. So, if the Gender value entered is upper case "F" ('C6'x) the result is 0 (not a changed weight) because that position in map M is 0. However, if the Gender value is lower case "f" ('86'x), the result is 1 indicating a change weight because that position in map M is 1.

For a multi-character column, such as Zip code 86 in the example in FIG. 3, if any character in the column value for any given row has a changed weight, the indicator in the CWS table for that column is set to on ("1"), indicating that at least one row in table T contains a lower case character in that column.

Figure 8:
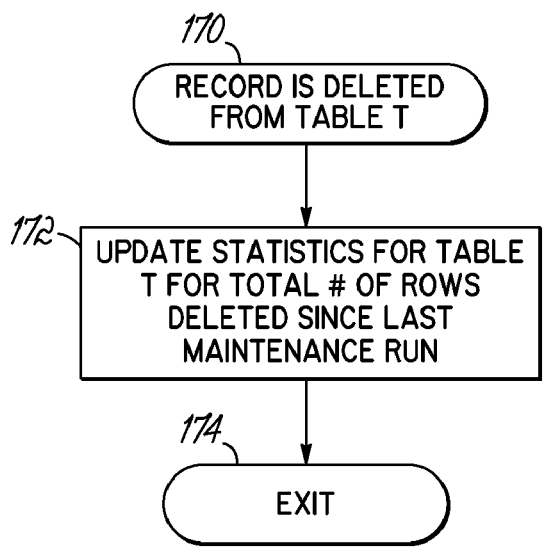
FIG. 8 is a flowchart illustrating the process for deleting a record from a database table in the DBMS of FIG. 2.
Figure 9:
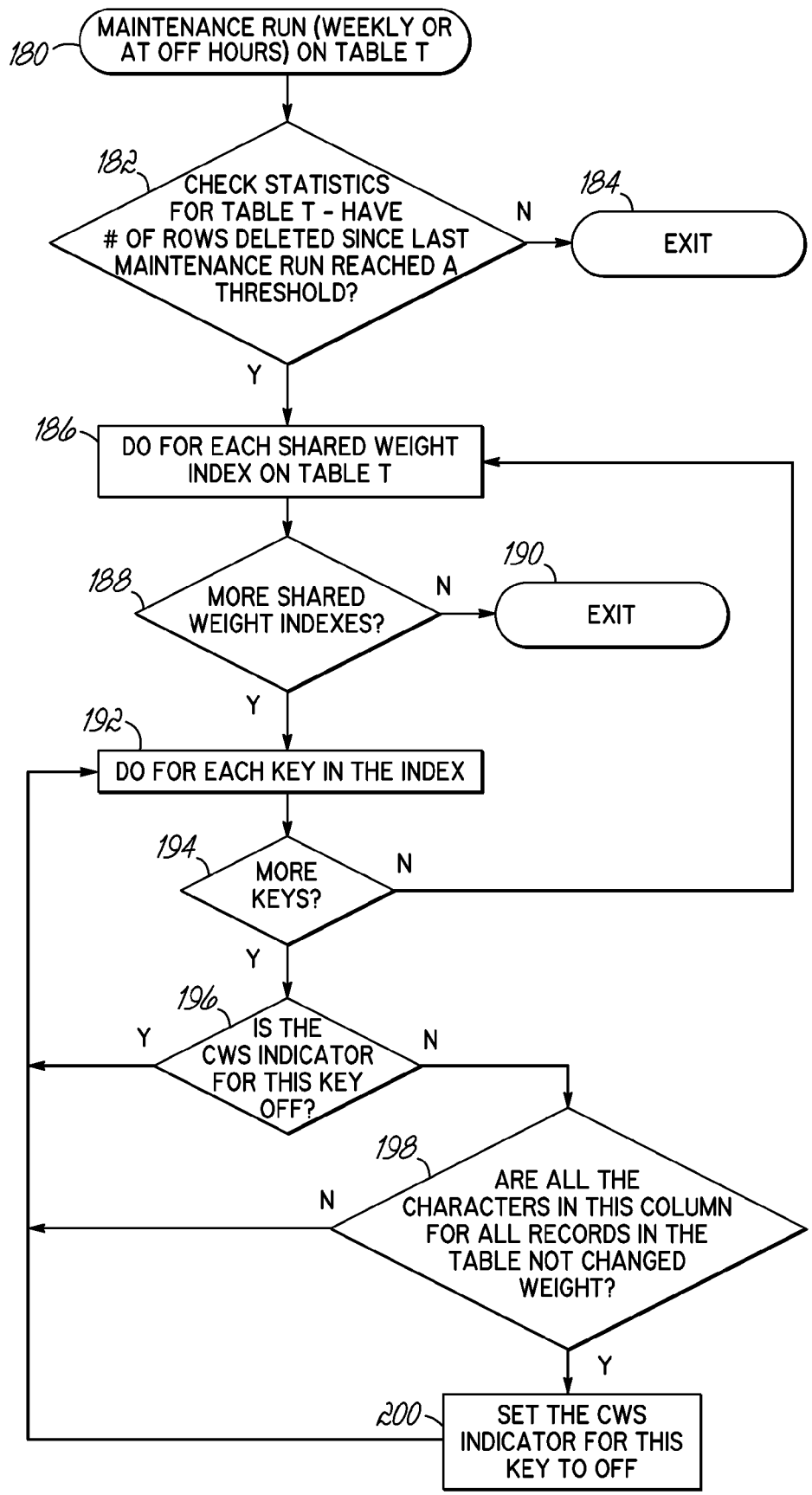
FIG. 9 is a flowchart illustrating the process for periodic maintenance of a database table in the DBMS of FIG. 2.

When a row is deleted, it is possible that CWS for any of the columns in that row should be updated. Since deletes are rare, one option would be to not update the CWS summary indicator, and CWS will then reflect the summary indication of all rows that have ever been in the table even if they have been deleted. Later, during a maintenance run, or at off hours, the index may be rebuilt to update the CWS for each column, or the maintenance can be done conditionally when a certain percent of rows have been deleted since the last maintenance run, as illustrated in flowcharts 170 and 180 in FIG. 8 and FIG. 9. In FIG. 8, each time a record is deleted; statistics for the table are updated for the total number of rows deleted since the last maintenance run (block 172). After the maintenance run has completed updating the table, statistics, and any other related entity, the process exits (block 174). In FIG. 9, generally during off hours, a maintenance run may be performed on the table. In an exemplary maintenance run, the statistics for the table are checked to see if the number of deleted rows in the table has reached a threshold, warranting a maintenance run (block 182). If the threshold has not been met ("No" branch of decision block 182), then the maintenance process exits (block 184).

If, however, the threshold has been met or exceeded, for each shared weight index (block 186), and for each key in the index (block 192) a check is made to determine if the CWS indicator of the current key is off (block 196). If the CWS indicator is off ("Yes" branch of decision block 196), then the process moves to the next key (blocks 192, 194). If, however, the CWS indicator is on ("No" branch of decision block 196), then a check is made to determine if all of the remaining characters after removal of the deleted records in the column are not changed weight (block 198). If there are changed weight characters ("No" branch of decision block 198), then the process moves to the next key (blocks 192, 194). Otherwise, if there are no changed weight characters ("Yes" branch of decision block 198), then the CWS indicator for the current key is set to off (block 200) and the process continues with the next key (blocks 192, 194). If there are no more keys ("No" branch of decision block 194), then the process moves on to the next shared weight index. If there are no further shared weight indexes ("No" branch of decision block 188), then the process exits (block 190).

Another option on a delete is to inspect each character in each column of the row being deleted, and if none of the characters in the row to be deleted is a changed weight for a given column, then the CWS summary indicator for that column need not be updated, but statistics may be updated. If a changed weight character is found in a column for a row being deleted, then statistics may be inspected to see if this is the only row with a changed weight in which case an adjustment may be made to the summary indicator in the CWS for that column to indicate no changed weights. If this is not the only row with changed weights, then the CWS summary indicator for this column will remain on (changed weights exist), and statistics may be updated.

Therefore, it may be seen that embodiments of the invention enable shared weight indexes to be used in additional situations, thus improving processing response time, reducing overhead by potentially reusing indexes and avoiding the costs associated with creating additional indexes. While embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the present invention. Accordingly, departures may be made from such details without departing from the spirit or scope of applicants' general inventive concept.

Other modifications will be apparent to one of ordinary skill in the art. Therefore, the invention lies in the claims hereinafter appended.

What is claimed is:

1. A computer-implemented method of processing a database query in a database management system including at least one processor, the method comprising, in response to receiving a database query including a sort of textual information:

determining with the at least one processor whether a shared weight index accessed by the database management system and associated with a column of a database table referenced by the database query can be utilized to optimize the database query, including determining whether the column includes at least one changed weight value and determining whether the database query references at least one changed weight value in the column;

generating a sort sequence data structure associated with the shared weight index, wherein the shared weight index includes a plurality of entries, and wherein the sort sequence data structure includes a value correlation for each entry of the shared weight index; and utilizing the shared weight index to optimize the database query in response to determining that the shared weight index can be utilized to optimize the database query.

2. The method of claim 1, wherein utilizing the shared weight index to optimize the database query includes utilizing the shared weight index as a non-shared weight index.

3. The method of claim 1, wherein determining whether the shared weight index associated with the column of the table referenced by the database query can be utilized to optimize the database query includes determining whether the shared weight index associated with the column of the table referenced by the database query can be utilized as a non-shared weight index to optimize the database query.

4. The method of claim 1, further comprising:
creating an index associated with the column from a database table.

5. The method of claim 4, wherein the index is configured with a shared weight attribute, the method further comprising:
creating the shared weight index based upon the index.

6. The method of claim 1, wherein the sort sequence data structure comprises a sort sequence table.

7. The method of claim 6, further comprising:
generating a weight map associated with the sort sequence table.

8. The method of claim 7, wherein the sort sequence table includes a plurality of entries, and wherein the weight map includes a weight correlation for each entry in the sort sequence table.

9. The method of claim 8, wherein the weight map contains a binary 1 in the location corresponding to each value to location offset pair in the sort sequence table that does not match.

10. The method of claim 9, wherein a binary 1 in any location in the weight map will cause the query optimizer to use an index other than the shared weight index for optimizing the query.

11. The method of claim 1, wherein the value correlation is associated with a location offset of the shared weight index.

12. An apparatus comprising:
a processor; and
program code configured to be executed by the processor to process a database query, the program code, in response to receiving a database query including a sort of textual information, is further configured to determine whether a shared weight index associated with a column of a database table referenced by the database query can be utilized to optimize the database query, including determining whether the column includes at least one changed weight value and determining whether the database query references at least one changed weight value in the column, and utilize the shared weight index to optimize the database query in response to determining that the shared weight index can be utilized to optimize the first database query, wherein the program code is further configured to generate a sort sequence data structure associated with the shared weight index, wherein the shared weight index includes a plurality of entries, and wherein the sort sequence data structure includes a value correlation for each entry of the shared weight index.

13. The apparatus of claim 12, wherein the program code is configured to utilize the shared weight index to optimize the database query by utilizing the shared weight index as a non-shared weight index.

14. The apparatus of claim 12, wherein the program code is configured to determine whether the shared weight index associated with the column of the table referenced by the database query can be utilized to optimize the database query by determining whether the shared weight index associated with the column of the table referenced by the database query can be utilized as a non-shared weight index to optimize the database query.

15. The apparatus of claim 12, wherein the program code is further configured to create an index associated with the column from a database table.

16. The apparatus of claim 15, wherein the index is configured with a shared weight attribute, the program code further configured to create the shared weight index based upon the index.

17. The apparatus of claim 12, wherein the sort sequence table comprises a sort sequence table.

18. The apparatus of claim 17, wherein the program code is further configured to generate a weight map associated with the sort sequence table.

19. The apparatus of claim 18, wherein the sort sequence table includes a plurality of entries, and wherein the weight map includes a weight correlation for each entry in the sort sequence table.

20. The apparatus of claim 19, wherein the weight map contains a binary 1 in the location corresponding to each value to location offset pair in the sort sequence table that does not match.

21. The apparatus of claim 20, wherein a binary 1 in any location in the weight map will cause the query optimizer to use an index other than the shared weight index for optimizing the query.

22. The apparatus of claim 12, wherein the value correlation is associated with a location offset of the shared weight index.

23. A program product, comprising:
a non-transitory computer readable storage medium; and
program code stored on the computer readable medium and configured to be executed by a processor to process a database query, the program code, in response to receiving a database query including a sort of textual information, is further configured to determine whether a shared weight index associated with a column of a database table referenced by the database query can be utilized to optimize the database query, including determining whether the column includes at least one changed weight value and determining whether the database query references at least one changed weight value in the column, and utilize the shared weight index to optimize the database query in response to determining that the shared weight index can be utilized to optimize the database query, wherein the program code is further configured to generate a sort sequence data structure associated with the shared weight index, wherein the shared weight index includes a plurality of entries, and wherein the sort sequence data structure includes a value correlation for each entry of the shared weight index.

* * * * *